United States Patent [19]
Lipsztajn et al.

[11] Patent Number: 5,480,516
[45] Date of Patent: Jan. 2, 1996

[54] ELECTROLYTIC PRODUCTION OF ACID

[75] Inventors: Marek Lipsztajn, Rexdale; Gerald Cowley, Mississauga; Dana Gourley, Waterloo, all of Canada

[73] Assignee: Sterling Pulp Chemicals, Ltd., Islington, Canada

[21] Appl. No.: 59,605

[22] Filed: May 12, 1993

[51] Int. Cl.$^6$ ............................................. C25B 1/26
[52] U.S. Cl. .................. 204/103; 204/180.1; 204/182.1; 204/96
[58] Field of Search ......................... 204/103, 104, 204/101, 182.1, 182.3, 182.4, 253, 267, 268, 180.1, 96

[56] References Cited

U.S. PATENT DOCUMENTS

| | | | |
|---|---|---|---|
| 4,536,269 | 8/1985 | Chlanda et al. | 204/182.4 |
| 4,915,927 | 4/1990 | Lipsztajn et al. | 423/472 |
| 5,084,148 | 1/1992 | Kazcur et al. | 204/95 |
| 5,122,240 | 6/1992 | Cowley et al. | 240/101 |
| 5,174,868 | 12/1992 | Lipsztajn et al. | 204/95 |
| 5,198,080 | 3/1993 | Cowley et al. | 204/101 |
| 5,250,159 | 10/1993 | Butterworth | 204/98 |
| 5,264,089 | 11/1993 | Kaczur | 204/95 |
| 5,294,316 | 3/1994 | Schmidt | 204/182.4 |

*Primary Examiner*—John Niebling
*Assistant Examiner*—Brendan Mee
*Attorney, Agent, or Firm*—Sim & McBurney

[57] ABSTRACT

A salt solution, particularly aqueous sodium chlorate, is acidified electrolytically at a higher current efficiency than has previously been the case by employing a plurality of multiple compartment cells, in which the effluent from intermediate compartments is passed through more anodic compartments.

41 Claims, 5 Drawing Sheets

ELECTROLYTIC PRODUCTION OF ACID

FIELD OF INVENTION

The present invention relates to the electrolytic production of acid from aqueous salt solutions by cascading electrolyte through multiple membrane-divided cells.

BACKGROUND TO THE INVENTION

In U.S. Pat. No. 5,122,240 (E437), assigned to the assignee hereof, there is described the electrochemical acidification of aqueous solutions of alkali metal salt solutions, particularly sodium sulfate, sodium chlorate and mixtures thereof, using an electrolytic cell having a cation-exchange membrane separating the anode and cathode compartments. The resulting acid solution is used to provide acid to a chlorine dioxide generator. The acidity level which can be achieved while retaining an acceptable level of current efficiency (greater than 70%), is quite limited in the case of sodium chlorate alone, although higher levels can be achieved with sodium sulfate and particularly mixtures of sodium sulfate and sodium chlorate.

It has also been described in U.S. Pat. No. 4,915,927 (E433), assigned to the assignee hereof, how to produce chloric acid electrochemically from sodium chlorate, using a three-compartment cell, in which sodium chlorate is fed to the central compartment, chlorate ions migrate through an anion-exchange membrane to an anode compartment wherein hydrogen ions are produced from an anolyte and the sodium ion migrate through a cation-exchange membrane to a cathode compartment wherein hydroxyl ions are produced from a catholyte. Chloric acid is removed from the anode compartment while sodium hydroxide is removed from the cathode compartment.

In U.S. Pat. No. 5,084,148, assigned to Olin Corporation, there is described the production of mixtures of chloric acid and sodium chlorate again in a three-compartment cell, but in this instance, two cation-exchange membranes are used and the mixture of chloric acid and sodium chlorate is removed from the central compartment.

In another embodiment of U.S. Pat. No. 5,084,148, the production of a mixture of chloric acid and sodium chlorate is effected in a four-compartment cell, equipped with three cation-exchange membranes wherein sodium chlorate solution is fed to the compartment adjacent to the cathode compartment and the product then is fed to the compartment adjacent to the anode compartment of the same cell where it is acidified further. A non-oxidizable acid, such as sulfuric acid, is circulated in the anode compartment.

As in the case of U.S. Pat. No. 5,122,240 mentioned above, the acidity level of chloric acid which can be achieved using these procedures at a reasonable level of current efficiency is quite low.

SUMMARY OF INVENTION

The present invention provides means whereby a significantly-increased level of acidity can be achieved along with an improved current efficiency. The procedure of the invention involves a cascading of electrolytes through a plurality of electrolytic cells, which permits a significant improvement in current efficiency to be attained during electrolysis of pure sodium chlorate solution to high levels of acidity.

In the present invention, a plurality of multicompartment electrolytic cells having an anode compartment, a cathode compartment and at least one additional compartment between the anode and cathode compartments is employed. An aqueous salt solution, particularly an alkali metal chlorate solution, preferably aqueous sodium chlorate solution, is passed initially through a central compartment of each of the plurality of cells, either in serial or parallel flow, and then is passed through the anode compartment of each of the plurality of cells, either in serial or parallel flow, or a combination thereof.

In one aspect of the present invention, there is provided a process for the electrolytic production of an acidified solution. Within a first electrolytic unit, there is established a first acidifying zone adjacent a cathodic zone and physically separated from the cathodic zone by a first cation-permeable structure and a second acidifying zone adjacent to the first acidifying zone and physically separated from the first acidifying zone by a second ion-permeable structure. An aqueous solution of a salt which has been partially acidified in a first acidifying zone of a second electrolytic unit is fed to the first acidifying zone of the first electrolytic unit to produce a further acidified salt solution. The further acidified salt solution then is fed to the second acidified zone to produce the acidified solution.

Another aspect of the present invention provides a process for the electrolytic production of an acidified solution, which comprises providing a plurality of electrolytic cells, each comprising an anodic compartment, a cathodic compartment and at least one intermediate compartment located between the anodic and cathodic compartments, each compartment being separated from the next adjacent compartment by a cation-permeable structure; subjecting an aqueous solution of a salt to a first acidification in a first compartment of each plurality of electrolytic cells located adjacent to the cathodic compartment, and subjecting the aqueous solution of a salt to a further acidification in a second compartment of each plurality of electrolytic cells located adjacent to the first compartment.

In a further aspect of the present invention, there is provided a process for electrolytic production of an acidified solution, which comprises providing at least one electrolytic cell comprising an anodic compartment, a cathodic compartment and at least one intermediate compartment located between the anodic and cathodic compartments, each compartment being separated from the next adjacent compartment by a cation-permeable structure; applying an electric current between an anode and a cathode of the cell while circulating a first aqueous solution of a salt through a first compartment located adjacent to the cathodic compartment and circulating a second aqueous solution of a salt through a second compartment located adjacent to the first compartment to effect acidification thereof until a desired acidity is achieved; withdrawing the acidified aqueous solution from the second compartment as a product acidified solution; passing effluent from the first compartment to the second compartment as the second aqueous solution of a salt circulated therein; passing further first aqueous solution of a salt to the first compartment and repeating said circulating, withdrawing and passing steps.

DESCRIPTION OF PREFERRED EMBODIMENT

Figure 1:
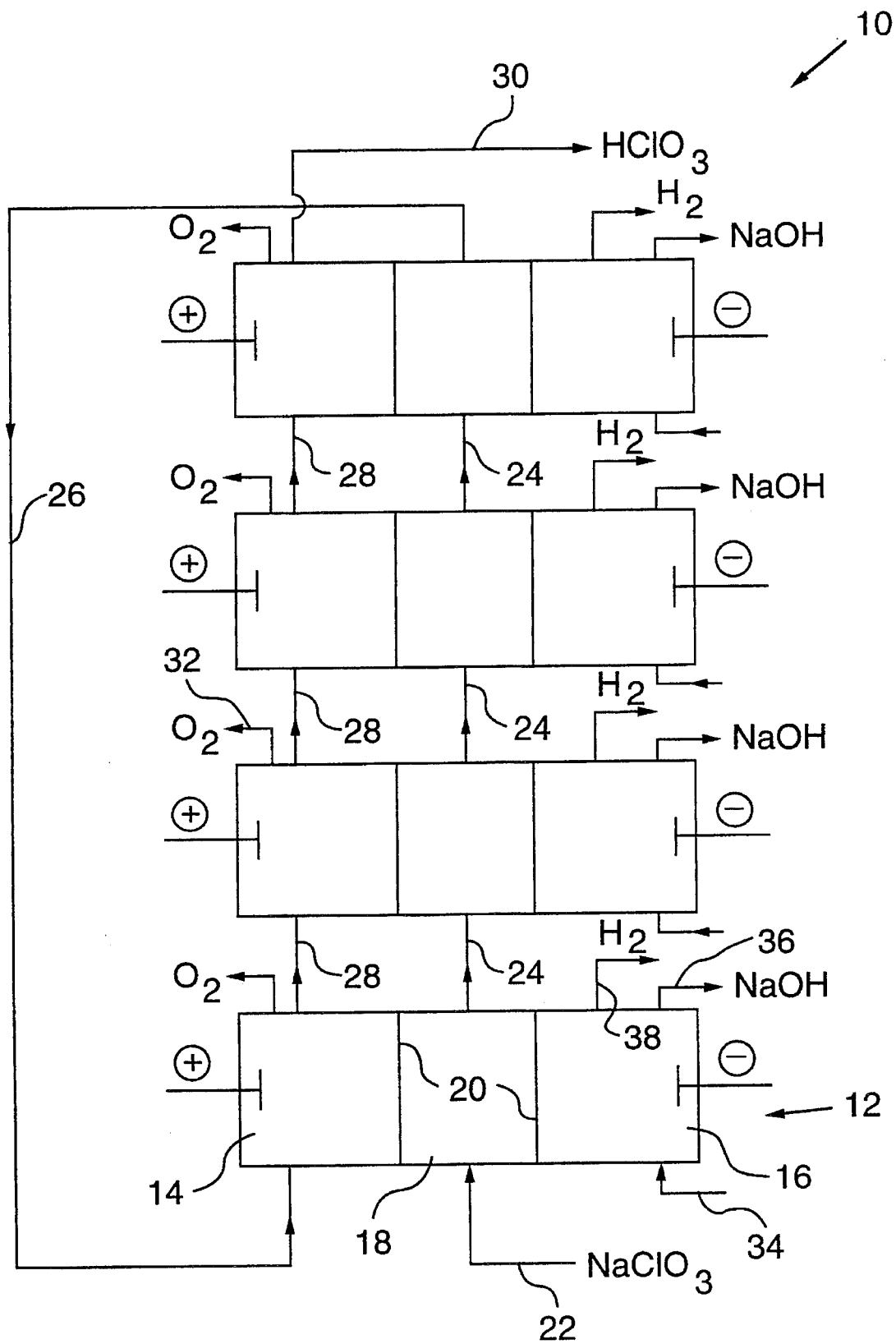
FIG. 1 is a schematic representation of a multiple number of three-compartment cells arranged for cascade flow of electrolyte through the central compartments and then through the anode compartments cocurrent to the direction of flow through the central compartments, in accordance with one embodiment of the invention.

Referring to the drawings, FIG. 1 illustrates one embodiment of the invention. The electrolytic acidification system 10 comprises a plurality of individual three-compartment cells 12, each divided into an anode compartment 14, a cathode compartment 16 and a central compartment 18, with the compartments being delineated by cation-exchange membranes 20.

While FIG. 1 illustrates four three-compartment cells, the number of cells may be varied, depending on the electrolyte processed and the current efficiency desired to be achieved for the acidity of product to be obtained. As seen in the illustrated other embodiments, cells having more than three compartments may be employed as well as combinations of 2-, 3- or 4-compartment cells. Cells with a larger number of compartments may be employed.

In addition, while cation-exchange membranes 20 separate the compartments from one another, it is possible to use other ion-permeable structures, such as combinations of cation exchange membranes and diaphragms in which a diaphragm separates the anode compartment from the central compartment and, less preferably the cathode compartment from the central compartment.

An aqueous solution of sodium chlorate is fed by line 22 to the central compartment 18 of a first three-compartment cell 12. The illustrated embodiment is described with reference to the use of aqueous sodium chlorate solution as the electrolyte, in view of utility of the resulting acidified product stream in the production of chlorine dioxide, as described in the aforementioned U.S. Pat. Nos. 5,122,240, 4,915,927 (E433) and 5,174,868 (E438). However, the present invention is broadly related to the acidification of any salt solution, preferably salts of strong acids, including aqueous solutions of mixtures of salts. Representative Examples of salts to which the present invention is applicable include other alkali metal chlorates and alkali metal sulfates, such as sodium sulfate.

While the acidification of the above-mentioned salts, i.e. chlorates and sulfates, is directly related to the formation of acidified solution for chlorine dioxide production, the salts of other acids, for example, nitric acid, perchloric acid, hydrochloric acid, hydrofluoric acid, phosphoric acid, mixtures of salts of two or more of such acids and mixtures of salts of such acids with salts of chloric and/or sulfuric acid, also can be acidified with high current efficiency.

The aqueous sodium chlorate solution is fed through each of the central compartments 18 of the multiple numbers of compartments, with the effluent from one compartment passing by line 24 to the next compartment, with a central compartment effluent being withdrawn by line 26 from the next one of the cells 12.

The aqueous sodium chlorate solution, which is mildly acidified by the transfer of hydrogen ions from the anode compartment, then is passed through each of the anode compartments of the three compartment cells in the same flow direction as the aqueous solution through the central compartments 18, with the effluent from the individual anode compartments 14 passing by line 28 to the next anode compartment 14 in the cascade. The product chloric acid-containing stream of desired acidity is removed by line 30 from the last anode compartment 14 in the cascade. Oxygen produced in the anode compartments 14 may be vented by line 32.

The cathode compartments 16 may be operated in cascade or in parallel flow, with electrolyte being fed by line 34 and aqueous sodium hydroxide solution being removed by line 36. Hydrogen produced in the cathode compartments 16 is vented by line 38. The sodium hydroxide coproduced with the chloric acid-containing solution in the apparatus 10 may be employed for pulp mill applications or other suitable application.

While the cathodic reaction for the illustrated embodiment produces aqueous sodium hydroxide solution, other cathodic reactions may be employed, for example, an electroreduction of oxygen to hydrogen peroxide and sodium hydroxide. Examples of alternative cathodic reactions include electroreduction of chlorine dioxide to produce sodium chlorite or electrosynthesis of sodium dithionite. An acidic catholyte, such as sodium acid sulfate, may be employed in place of sodium hydroxide, as described in U.S.

Pat. No. 5,198,080 (E437 cip), assigned to the assignee hereof.

Similarly, while hydrogen ions are electrolytically produced in the illustrated embodiment, alternative oxidation reactions producing hydrogen ions may be employed, for example, hydrogen gas oxidation to hydrogen ions, which procedure may be combined with oxygen gas electroreduction as a cathodic reaction, to provide a fuel cell operation, which produces electrical energy.

A combination of several cells, operating with alternative anodic and/or cathodic reactions also is possible. For example, in some cells, the anodic reaction may be oxygen evolution while, at the same time, anodic oxidation of hydrogen in other cells may be employed. This particular combination is especially useful when an excess of hydrogen is required for an efficient operation of the hydrogen depolarized anodes and the source of hydrogen is the cathodic reduction of water.

When an anodic oxidation of hydrogen gas to hydrogen ions is combined with a cathodic reduction of water to hydroxyl ions and hydrogen gas, the latter gas may be used as an anodic feed and, at the same time, a substantial energy savings may be achieved, as a result of the difference in electrochemical reaction potentials. Similarly, an analogous energy and material savings is achieved when an anodic oxidation of water to hydrogen ions and oxygen is combined with cathodic reduction of the oxygen gas stream.

It is preferred to operate the procedure of the invention to achieve a current efficiency of at least about 70%, preferably at least about 75%. Without being bound by any particular theory, it is believed that such an efficient operation requires a minimization of the acidity level in the compartments adjacent to the cathode compartments.

Since a single pass of an electrolyte through both central and anodic compartments of a three-compartment cell does not result in a sufficiently high level of acidity in the product at the electrolyte flow rates that are acceptable for the cell operation, the acidification process, as described in the prior art, has to be repeated several times with the electrolyte circulated through the compartment adjacent to the cathode compartment becoming more and more acidic. It is believed that such an operation, as described in the prior art, results in significant losses of current efficiency, especially at a higher degree of acidification. As a consequence, the current efficiency values reported in the prior art, for example, in the previously mentioned U.S. Pat. Nos. 5,084,148 and 5,122,240, are significantly lower than those achieved in the present invention, especially at higher acidity levels in the product.

It is believed that the operation as described in the present invention leads to a minimization of the acidity level in the compartments adjacent to the cathode compartments while achieving high acidity level in the final product being withdrawn from the anode compartments.

Factors that may influence the acidity level in the central compartments are, among others, the flow rate which determines the residence time, dimensions of the compartments, current density and the concentration of salt and acid, as well as strength of the catholyte.

In certain embodiments, for example, that depicted in FIG. 3 and described in more detail below, the flow rate through the central compartments has to be adjusted to lower values so that a combined flow rate through all central compartments matches the flow rate through the anode compartments. The absolute values of the flow rates throughout the system may vary due to the water transport through the cation exchange membranes and water consumption in electrolytic reactions. Generally, the volume of electrolyte in the anode compartment decreases, while flow volume of catholyte increases. Any convenient salt concentration may be employed, generally any concentration up to saturation can be used.

Current density values are generally optimized based on the long-term performance of various cell components, such as anodes and membranes, as well as based on the power requirements, which in turn are dependent on current efficiency and cell voltage. Typical current density values vary from about 0.5 up to about 10 kA/m$^2$, preferably from about 1 to about 5 kA/m$^2$.

A number of alternative configurations and procedures are available to effect the process of the invention and achieve the desired results of enhanced acidity levels at acceptable current efficiencies or enhanced current efficiency at the same acidity levels and these are illustrated in FIGS. 2 to 8.

Figure 2:
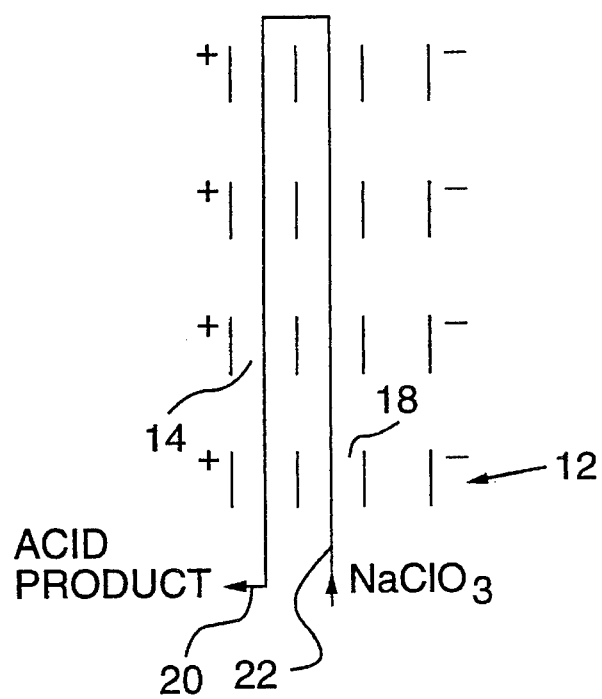
FIG. 2 is a schematic representation of an alternative scheme in which the cascaded flow through the central compartments is cascaded through the anode compartments countercurrent to the direction of flow through the central compartments.

In FIG. 2, the cascaded flow of electrolyte 22 through the central compartments 18 of a plurality of three-compartment cells 12 is cascaded through the anode compartments 14 counter-current to the direction of flow of electrolyte through the central compartments 18, i.e. the opposite direction to the direction of flow illustrated in FIG. 1, to form the chloric acid product 30.

Figure 3:
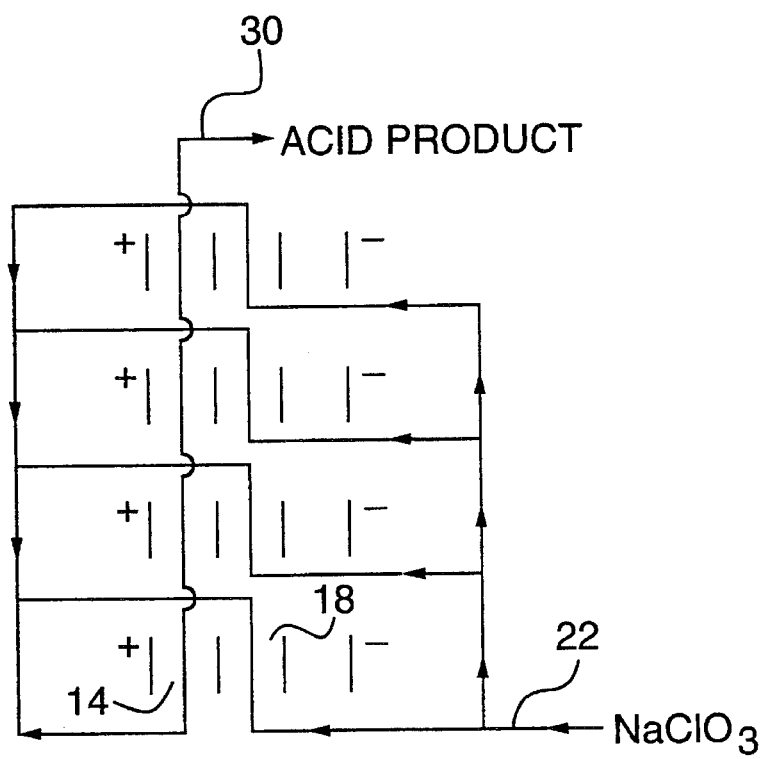
FIG. 3 is a schematic representation of an alternative embodiment of the invention in which the electrolyte is passed in parallel through the central compartments and the combined effluent from the central compartments then is cascaded through the anode compartments.

In FIG. 3, the electrolyte 22 is passed in parallel through the central compartments 18 of a plurality of three-compartment cells 12 and the combined effluent from the central compartments 18 then is cascaded through the anode compartments 14 of the plurality of three-compartment cells, to form the chloric acid product 30.

Figure 4:
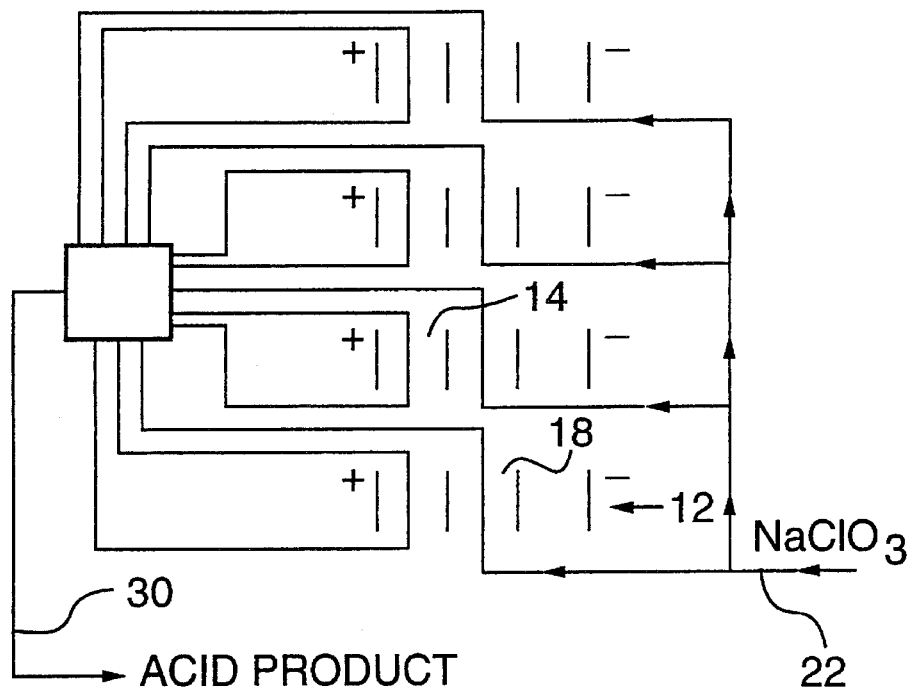
FIG. 4 is a schematic representation of a further embodiment of the invention in which the electrolyte is passed in parallel through the central compartments and the combined effluent from the central compartments then is fed in parallel through the anode compartments.

FIG. 4 illustrates an alternative procedure in which the electrolyte 22 is passed in parallel through the central compartments 18 of a plurality of three-compartment cells 12 and the combined effluent from the central compartments 18 then is fed in parallel through the anode compartments 14 of the three-compartment cells 12, to form the chloric acid product 30. Recirculation of electrolyte through the anode compartments 14 also may be effected to increase the acidity of the product.

Alternatively to the specific embodiments represented by FIGS. 3 and 4, a combination of two- and three-compartment cells can be used wherein the electrolyte is passed in parallel through the compartments adjacent the cathode compartments and the combined effluents from such compartments is passed through the anode compartments of the three-compartment cells, either in series or in parallel or in a combination thereof, with or without recirculation of electrolyte in the anode compartments of the three-compartment cells.

Figure 5:
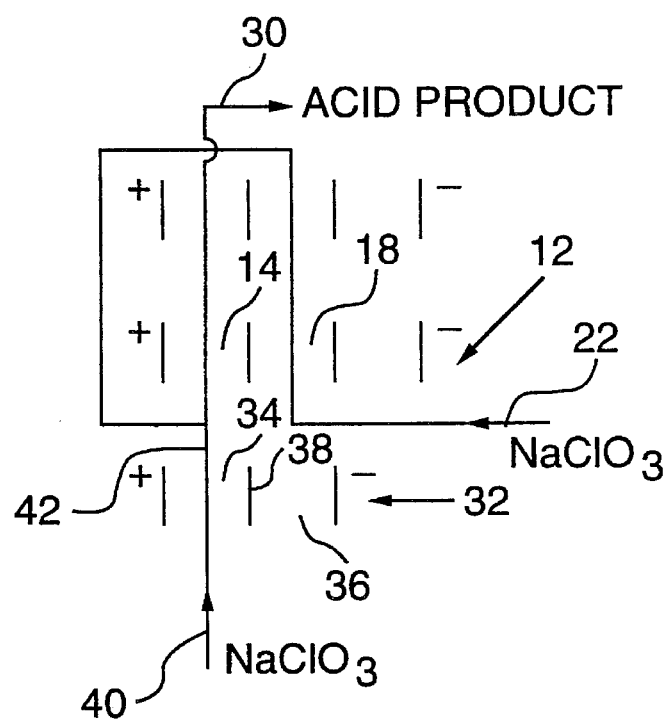
FIG. 5 is a schematic representation of another embodiment of the invention, in which three-compartment cells are combined with a two-compartment cell, with a low acidity product produced at high efficiency from the two-compartment cell being forwarded to the anode compartment of one of the three-compartment cells to join with electrolyte cascaded through the central compartments of the three-compartment cells to be cascaded through the anode compartments.

In FIG. 5, a plurality of three-compartment cells 12 is combined with a two-compartment cell 32, divided into an anode compartment 34 and a cathode compartment 36 by a cation-exchange membrane 38. An electrolyte in the form of an aqueous sodium chlorate solution in line 40 first is fed to the anode compartment 34 of the two-compartment cell 32 and the low acidity product in line 42 is forwarded to the anode compartment 14 of one of a plurality of three-compartment cells 12 to join with the electrolyte 22 cascaded through the central compartments 18 of the three-compartment cells 12 to be cascaded through the anode compartments 14.

While the embodiment of FIG. 5 illustrates the combination of three-compartment cells with a single two-compartment cell, more than one two-compartment cell may be employed. As an alternative to the illustrated procedure, the low acidity product from the two-compartment cell 32 in line 42 may be forwarded to the central compartment 18 of one of the three-compartment cells 12 and then cascaded first through the central compartments 18 of the remaining three-compartment cells 12, followed by passage through the anode compartment 14 of the three compartment cells, in similar manner to that illustrated in FIGS. 1 and 2.

In yet another configuration involving two- and three-compartment cells, the electrolyte passes in series through the central compartments of the three-compartment cells and then it is acidified further in the anodic compartments of the two-compartment cells followed by the anodic compartments of the three-compartment cells.

Figure 6:
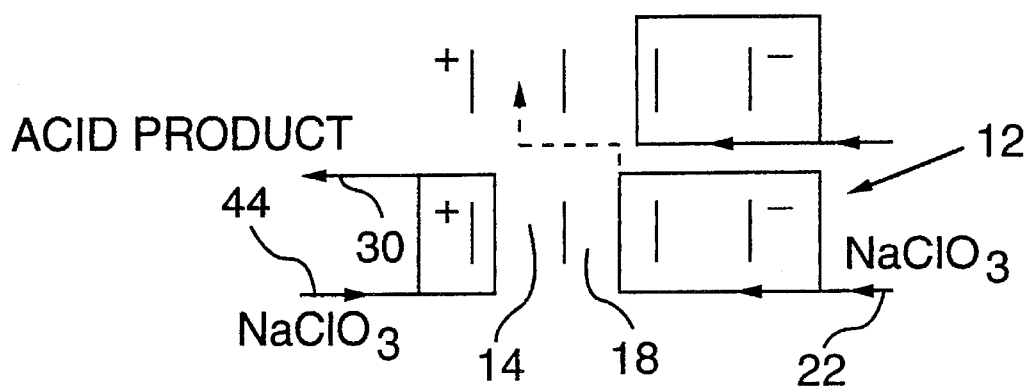
FIG. 6 is a schematic representation of a yet further embodiment of the invention, wherein the electrolyte is recirculated independently through the central and anode compartments of a three-compartment cell and, when a desired level of acidity is reached in the anode compartment, the product from the anode compartment is withdrawn while the product from the central compartment is forwarded to the anode compartment to be used as anolyte in the preparation of the next batch of product.

FIG. 6 illustrates a further alternative, in which the electrolyte 22 is recirculated through the central compartment 18 of a three-compartment cell 14 while acidified electrolyte in line 44 is recirculated independently through the anodic compartment 14 of the cell 12. Such independent recirculation of electrolytes is effected until such time as the electrolyte 44 in the anodic compartment 14 reaches the desired acidity, at which time the product acid 30 is removed from the anodic compartment 14.

The partially-acidified electrolyte then is passed from the central compartment 18 of the cell 12 to the anode compartment 14 by feed line 44 while fresh electrolyte 22 is charged to the central compartment 18 and the operation is repeated.

While the independent recirculation procedure of FIG. 6 has been illustrated using a single three-compartment cell 12, a plurality of such three-compartment cells may be employed, wherein the operation is carried out with parallel flows of electrolyte through the anode and central compartments. Further, the partially-acidified electrolyte produced in the central compartment 18 of one cell 12 may be fed to the anode compartment 14 of another three-compartment cell 12, as depicted by the phantom line in FIG. 6.

Figure 7:
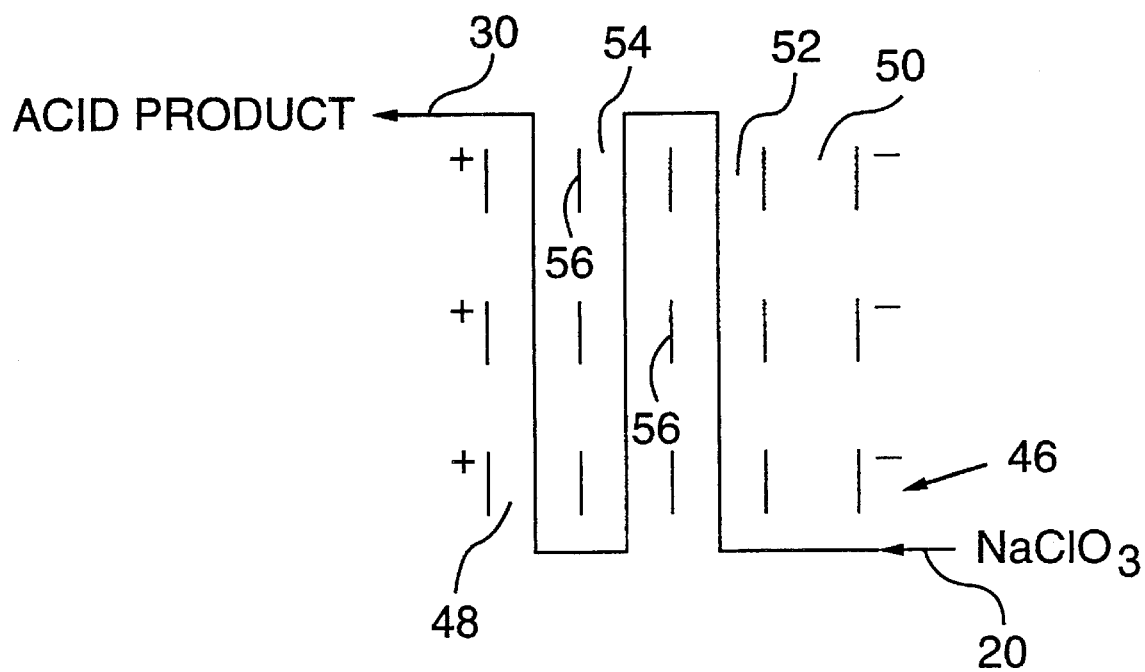
FIG. 7 is a schematic representation of a yet additional embodiment of the invention, wherein a series of four-compartment cells is utilized, with the electrolyte passing in cascade flow through the intermediate compartments closer to the cathode compartments, then through the intermediate compartments closer to the anode compartments and finally through the anode compartments.

In FIG. 7, a plurality of four compartment cells 46 is employed, each divided into an anode compartment 48, a cathode compartment 50 and two intermediate compartments 52 and 54 by cation-exchange membrane 56. The electrolyte 22 is passed in cascade flow through the intermediate compartments 52 closer to the cathode compartment 50, then through the intermediate compartments 54 closer to the anode compartments 48 in a flow direction opposite to that through intermediate compartments 52 and then through the anode compartments 48 in a flow direction opposite to that through intermediate compartments 54. The flow direction may be the same in the groups of compartments. In addition, flow through the anode compartments may be omitted, if desired, with a suitable non-oxidizable electrolyte, such as sulfuric acid, passing through or being circulated in the anode compartments.

Figure 8:
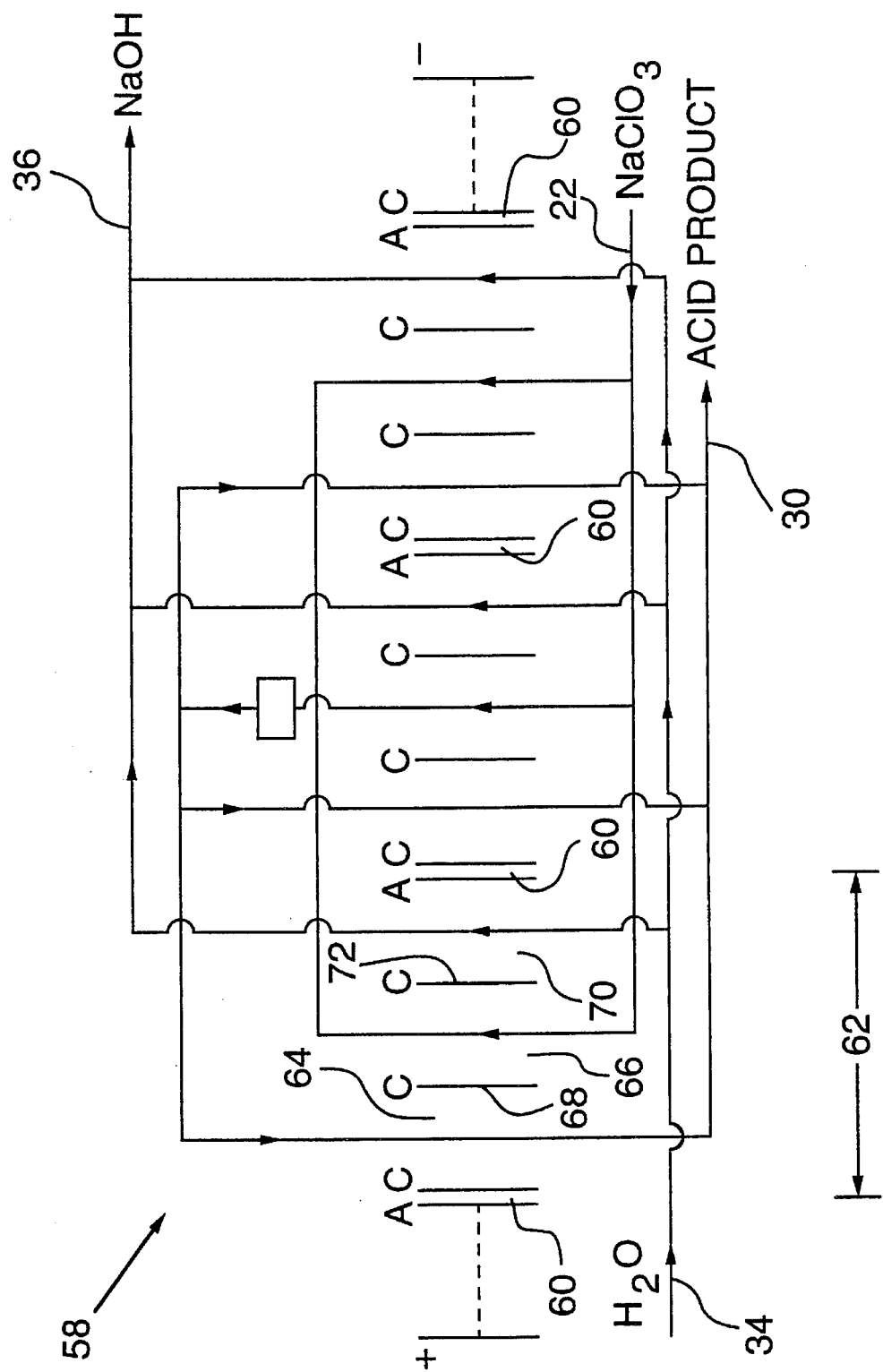
FIG. 8 is a schematic representation of a further embodiment of the invention, utilizing a cell equipped with bipolar membranes, in which the electrolyte is passed in parallel through all central compartments of the unit cells, each unit cell consisting of an acid compartment facing the cation face of the bipolar membrane, at least one central compartment separated from the acid compartment by a cation exchange membrane and a base compartment facing the anionic face of the bipolar membrane and separated from the adjacent central compartment by means of a cation exchange membrane, and then in parallel through an acid compartment of each unit cell.

FIG. 8 illustrates application of the principles of the present invention to a cell 58 equipped with bipolar membranes 60. Each unit cell 62 consists of an acid compartment 64 facing the cation face (C) of a bipolar membrane 60 separating the unit cell 62 from a like unit cell to the left, at least one central compartment 66 separated from the acid compartment 64 by a cation-exchange membrane 68 and a base compartment 70 facing the anionic face (A) of a bipolar membrane 60 separating the unit cell 62 from a like unit cell to the right and separated from the adjacent central compartment 66 by a cation-exchange membrane 72.

The electrolyte 22 is passed in parallel through all the central compartments 66 of the unit cells 62 included in the cell 58 and then in parallel through all the acid compartments 64 of the cell 58, to produce the acid product 30. The base compartments 70 also are fed in parallel by electrolyte 34 to produce sodium hydroxide product in line 36.

A batch process, as depicted in FIG. 6, may be employed with the cell 58 equipped with bipolar membranes of FIG. 8, with an independent flow through the acid and central compartments being effected.

The unit cells 62 are illustrated as being equipped with cation-exchange membranes 68, 72 defining the internal compartments. However, any other desired cation-permeable structure may be employed, as described above, for example, with respect to the embodiment of FIG. 1.

In addition, while there is illustrated in FIG. 8 a parallel flow of electrolyte through all the central compartments 66 and then a parallel flow of electrolyte through all the acid compartments 64, series flow of electrolyte through the central compartments 66 and/or the acid compartments 64 may be carried out, although more difficult to effect than the parallel flow.

In addition, a parallel flow through the central compartments 66 may be combined with a series flow through the acid compartments 64.

Other possible procedures exist. For example, two or more cascaded cell operations may be operated in parallel. In addition, with four-compartment cells, it is possible to feed the anode compartment with an acidic electrolyte, such as sulfuric acid, which is subsequently circulated in the anodic compartment loop and pass the aqueous electrolyte intended for acidification first through the intermediate compartment adjacent the cathode compartment and then through the intermediate compartment adjacent the anode compartment, to provide the acidified product.

A similar approach may be taken using a cell equipped with bipolar membranes. Since most of the existing bipolar membranes are not sufficiently resistant towards strong oxidizers, for example, chloric acid, it is preferred to circulate a non-oxidizable acid, for example, sulfuric acid, in the compartments adjacent to the cationic faces of bipolar membranes, while effecting production of chloric acid in the central compartments.

EXAMPLES

Example 1

A cascade arrangement of four three-compartment cells as shown in FIG. 1 was set up, with aqueous sodium chlorate electrolyte flowing in a cascade through the central compartments and then in a cascade through the anode compartments to produce a chloric acid-containing product. A series of experiments were conducted with this arrangement. The catholyte was not cascaded but rather flowed in parallel in the four cathode compartments.

Each of the three-compartment cells was equipped with a DSA-$O_2$® anode, a mild steel cathode and had two NAFION® 417 cation-exchange membranes dividing the interior of each cell into three compartments. The surface area of the membranes and electrodes employed was 100 $cm^2$. The current density applied in each cell was 3 $kA/m^2$.

The gaseous product ($O_2$) produced in each anode compartment was disengaged using a suitable disengagement vessel. The central and anode compartments were initially charged with approximately 6M aqueous sodium chlorate and final product was collected only after steady-state conditions at a maximum acidity was achieved. Steady-state operation continued for several hours with the acidity level in the product being periodically monitored.

Following achievement of steady-state conditions, a known volume of anolyte was collected in a given period of time and, from the total charge passed during this time period, the current efficiency values were determined. Variations in acid level were achieved by variation of the anolyte flow rate, with the lower flow rates producing higher acidity products, as a result of the same amount of acid produced in the anodic reaction:

$$2H_2O \rightarrow \tfrac{1}{2}O_2 + 2e + 2H^+$$

being contained in a smaller volume of electrolyte. By manipulation of the flow rate, an acidity range from about 1 to about 2.7N was achieved.

To determine the current efficiency, the amount of product obtained in a given period of time was compared to the theoretical production that should have been achieved in this period of time. Independently, the measurement of current efficiency also was made based upon the production in the cathode compartment.

The results obtained are set forth in Table I below and compared to the results for a single two-compartment cell presented in FIG. 3 of aforementioned U.S. Pat. No. 5,122,240 and to one experiment in which a single three-compartment cell was used and the electrolyte was circulated through both the central and anode compartments until the desired acidity was reached. Such an operation is equivalent to the operation involving a plurality of three-compartment cells wherein the electrolyte is passed through the central to the anodic compartment of the first cell and the product from the anodic compartment from the first cell is forwarded to the central compartment of the second three-compartment cell from which the electrolyte is directed to the anode compartment of the second cell, and so on.

TABLE I

| Product Acidity (M) | This Invention | Current Efficiency % U.S. Pat. No. 5,122,240 | 3-Compartment Cell with Recirculation |
|---|---|---|---|
| 1.09 | 83.2 | 70 | (1.74 M) 65 |
| 1.37 | 82.3 | 64 | |
| 1.55 | 82.8 | 62 | |
| 1.68 | 79.6 | 58 | |
| 1.91 | 76.6 | 54 | |
| 2.53 | 75.6 | — | |
| 2.73 | 72.2 | — | |

As may be seen from this data, improvements in current efficiency of approximately 15 to 20% are achieved, particularly at the higher acidity using the configuration of FIG. 1, compared to the single two-compartment cell structure of U.S. Pat. No. 5,122,240 and to the single three-compartment cell structure in which the effluent from the central compartment of the three-compartment cell is directed to the anode compartment of the same cell and such a process is repeated until a desired acidity is reached.

Example 2

Approximately 6M aqueous sodium chlorate solution was fed independently to the central and anode compartments of a three-compartment cell constructed identically to those used in Example 1. Both solutions were circulated and the electrochemical acidification continued until the acidity of the electrolyte removed from the anode compartment reached 1.73 molar. At that time, the acidity in the central compartment loop had reached 0.4 molar. The overall current efficiency was 80.3%. This Example illustrates the operation shown in FIG. 6.

SUMMARY OF DISCLOSURE

In summary of this disclosure, the present invention provides an electrolytic method of acidifying salt solutions which has an improved current efficiency in relation to prior procedures, which enables higher acidity levels to be achieved at acceptable current efficiency values. Modifications are possible within the scope of this invention.

What we claim is:

1. A process for the electrolytic production of an acidified solution, which comprises:

providing a first discrete electrolytic unit containing a first acidifying zone of said first discrete electrolytic unit adjacent to a cathodic zone of said first discrete electrolytic unit, a first ion-permeable structure in said first discrete electrolytic unit separating said first acidifying zone of said first discrete electrolytic unit from said cathodic zone of said first electrolytic unit and a second acidifying zone of said first discrete electrolytic unit adjacent to said first acidifying zone of said first discrete electrolytic unit, and a second ion-permeable structure in said first discrete electrolytic unit separating said second acidifying zone from said first acidifying zone, providing a second discrete electrolytic unit separate from said first discrete electrolytic unit containing a first acidifying zone of said second discrete electrolytic unit adjacent to a cathodic zone of said second discrete electrolytic unit and a first ion-permeable structure in said second discrete electrolytic unit separating said first acidifying zone of said second discrete electrolytic unit and said cathodic zone of said second discrete electrolytic unit, feeding an aqueous solution of a salt which has been partially acidified in said first acidifying zone of said second discrete electrolytic unit to said first acidifying zone of said first discrete electrolytic unit to produce a further acidified salt solution, and feeding said further acidified salt solution directly to said second acidifying zone of said first discrete electrolytic unit to produce said acidified solution.

2. The process of claim 1 wherein said first and second ion-permeable structures in said first discrete electrolytic unit comprise first and second cation-exchange membranes of said first electrolytic unit.

3. The process of claim 2 wherein said first ion-permeable structure in said second discrete electrolytic unit comprises a first cation-exchange membrane of said second electrolytic unit.

4. The process of claim 3 wherein a hydroxide comprising the cation of said salt is produced in said cathodic zone.

5. The process of claim 3 wherein the first acidifying zone of the first electrolytic unit comprises a central compartment of a first three-compartment cell, said second acidifying zone of said first electrolytic unit comprises an anode compartment of said first three-compartment cell, and said cathodic zone of said first electrolytic unit comprises a cathode compartment of said first three-compartment cell.

6. The process of claim 5 wherein the first acidifying zone of said second electrolytic unit comprises an anode compartment of a two-compartment cell and said cathodic zone of said second electrolytic unit comprises a cathode compartment of said two-compartment cell.

7. The process of claim 5 wherein the first acidifying zone of said second electrolytic unit comprises a central compartment of a second three-compartment cell and said cathodic zone comprises a cathode compartment of said second three-compartment cell, and said second electrolytic unit possesses a second acidifying zone physically-separated from said first acidifying zone by a second cation-exchange membrane of said second electrolytic unit and comprising an anode compartment of said second three-compartment cell.

8. The process of claim 1 wherein said aqueous solution of a salt comprises an aqueous solution of at least one salt of at least one acid selected from the group consisting of chloric acid, sulfuric acid, nitric acid, perchloric acid, hydrochloric acid, hydrofluoric acid and phosphoric acid.

9. The process of claim 1 wherein said aqueous solution of a salt comprises an aqueous solution of sodium chlorate so as to form an acidified solution containing chloric acid.

10. A process for the electrolytic production of an acidified solution of chloric acid, which comprises:

providing a plurality of electrolytic cells, each comprising an anodic compartment, a cathodic compartment and at least one intermediate compartment located between said anodic and cathodic compartments, each said compartments being separated from the next adjacent compartment by a cation-permeable structure, subjecting an aqueous solution of sodium chlorate to a first acidification in a first compartment of each said plurality of electrolytic cells located adjacent to said cathodic compartment, and subjecting said aqueous sodium chlorate solution to a further acidification in a second compartment of each said plurality of electrolytic cells located adjacent to said first compartment.

11. The process of claim 10 wherein said cation-permeable structure comprises a cation-exchange membrane or a diaphragm.

12. The process of claim 11 wherein a hydroxide comprising the cation of said salt is produced in said cathodic compartment.

13. The process of claim 10 wherein said cation-permeable structure between said first compartment and said cathode compartment comprises a cation-exchange membrane and said cation-permeable structure between said first and second compartments comprises a cation-exchange membrane.

14. The process of claim 13, wherein said second compartment comprises said anodic compartment.

15. The process of claim 10 wherein said plurality of electrolytic cells comprises a bipolar cell provided with bipolar membranes separating a plurality of unit cells, each comprising an acid compartment facing the cation-face of a first bipolar membrane separating the unit cell from one next-adjacent unit cell, at least one intermediate compartment separated from said acid compartment by a first cation-permeable structure and a base compartment facing the anionic face of a second bipolar membrane separating the unit cell from another next-adjacent unit cell and separated from an adjacent intermediate compartment by a second cation-permeable structure.

16. The process of claim 15 wherein said first and second cation-permeable structures comprise cation-exchange membranes.

17. A process for the electrolytic production of an acidified solution, which comprises:

providing a plurality of electrolytic cells, each comprising an anodic compartment, a cathodic compartment and at least one intermediate compartment located between said anodic and cathodic compartments, each said compartment being separated from the next adjacent compartment by a cation-exchange membrane, subjecting an aqueous solution of a salt to a first acidification in a first compartment of each said plurality of electrolytic cells located adjacent to said cathodic compartment by feeding said aqueous salt solution sequentially through said first compartments of each said electrolytic cell to effect said first acidification, and subjecting said aqueous solution of a salt to a further acidification in a second compartment of each said plurality of electrolytic cells located adjacent to said first compartment by subsequently directly feeding said aqueous salt solution sequentially through said anodic compartments of each said electrolytic cell to effect said further acidification.

18. The process of claim 17 wherein said aqueous salt solution is fed in a co-current or counter-current direction through said anodic compartments in each said electrolytic cells to the flow of said salt solution through said first compartments.

19. A process for the electrolytic production of an acidified solution, which comprises:

providing a plurality of electrolytic cells, each comprising an anode compartment, a cathode compartment and at least one intermediate compartment located between said anodic and cathodic compartment, each said compartment being separated from the next adjacent compartment by a cation-exchange membrane, subjecting an aqueous solution of a salt to a first acidification in a first compartment of each said plurality of electrolytic cells located adjacent to said cathodic compartment by feeding said aqueous salt solution in parallel through said first compartment of each said electrolytic cell to effect said first acidification, and subjecting said aqueous solution of a salt to a further acidification in said anodic compartment of each said plurality of electrolytic cells by feeding said aqueous salt solution sequentially through said anodic compartments of each said electrolytic cell to effect said further acidification.

20. A process for the electrolytic production of an acidified solution, which comprises:

providing a plurality of electrolytic cells, each comprising an anode compartment, a cathode compartment and at least one intermediate compartment located between said anodic and cathodic compartment, each said compartment being separated from the next adjacent compartment by a cation-exchange membrane, subjecting an aqueous solution of a salt to a first acidification in a first compartment of each said plurality of electrolytic cells located adjacent to said cathodic compartment by feeding said aqueous salt solution in parallel through said first compartment of each said electrolytic cell to effect said first acidification, and subjecting said aqueous solution of a salt to a further acidification in said anodic compartment of each said plurality of electrolytic cells by feeding said aqueous salt solution in parallel through anodic compartments of each said electrolytic cell to effect said further acidification.

21. The process of claim 20 wherein recirculation of said aqueous salt solution is effected in each said anodic compartment to effect said further acidification.

22. A process for the electrolytic production of an acidified solution, which comprises:

providing a plurality of electrolytic cells, each comprising an anodic compartment, a cathodic compartment, a first intermediate compartment located adjacent said cathodic compartment and a second intermediate compartment located between said anodic compartment and said first intermediate compartment, each said compartment being separated from the next adjacent compartment by a cation exchange membrane, electrochemically acidifying an aqueous solution of a salt in said first intermediate compartment of each said plurality of electrolytic cells to form a first acidified aqueous solution, feeding said first acidified aqueous solution directly to said second intermediate compartment, and electrochemically acidifying said first acidified aqueous solution.

23. The process of claim 22 wherein said aqueous salt solution is fed sequentially through said first intermediate compartments of each said electrolytic cell to effect said first acidification and then is fed sequentially through said second intermediate compartment of each said electrolytic cell to effect said further acidification.

24. The process of claim 23 wherein, subsequent to said further acidification, said aqueous salt solution is further fed sequentially through said anodic compartments of each said electrolytic cell to effect additional acidification of said aqueous salt solution.

25. The process of claim 23 wherein a non-oxidizable electrolyte is circulated through said anodic compartments of each said electrolytic cell.

26. A process for the electrolytic production of an acidified solution, which comprises:

providing a plurality of electrolytic cells comprising a bipolar cell provided with bipolar membranes separating a plurality of unit cells, each unit cell comprising an acid compartment facing the cation face of a first bipolar membrane separating the unit cell from one next-adjacent unit cell, at least one intermediate compartment separated from said acid compartment by a first cation-permeable structure and a base compartment facing the anodic face of a second bipolar membrane separating the unit cell from another next-adjacent unit cell and separated from an adjacent intermediate compartment by a second cation-permeable structure, subjecting an aqueous solution of a salt to a first acidification in a first compartment of said plurality of electrolytic cells located adjacent said base compartment by feeding said aqueous solution of a salt in parallel through each said intermediate compartment of each unit cell of said bipolar cell to effect said first acidification, and subjecting said aqueous solution of a salt to a further acidification in a second compartment of each said plurality of electrolytic cells located adjacent to said first compartment by feeding the combined effluent from said intermediate compartments in parallel through each said acid compartments as said aqueous solution of a salt to effect said further acidification therein.

27. The process of claim 26 wherein said aqueous salt solution is recirculated through each said acid compartment until a desired degree of acidification has been effected.

28. A process for the electrolytic production of an acidified solution, which comprises:

providing a plurality of electrolytic cells comprising a bipolar cell provided with bipolar membranes separating a plurality of unit cells, each unit cell comprising an acid compartment facing the cation face of a first bipolar membrane separating the unit cell from one next-adjacent unit cell, at least one intermediate compartment separated from said acid compartment by a first cation-permeable structure and a base compartment facing the anodic face of a second bipolar membrane separating the unit cell from another next-adjacent unit cell and separated from an adjacent intermediate compartment by a second cation-permeable structure, subjecting an aqueous solution of a salt to a first acidification in a first compartment of said plurality of electrolytic cells located adjacent said base compartment by feeding said aqueous solution of a salt in parallel through each first intermediate compartment of each unit cell of said bipolar cell adjacent to said base compartment to effect said first acidification, subjecting said aqueous solution of a salt to a further acidification in a second compartment of each said plurality of electrolytic cells located adjacent to said first compartment by feeding the combined effluent from said first intermediate compartments in parallel through each second intermediate compartment of each unit cell of said bipolar cell adjacent to said acid compartment to effect said further acidification therein, and passing a non-oxidizable electrolyte through each said acid compartments.

29. A process for the electrolytic production of an acidified solution, which comprises:

providing a plurality of electrolytic cells comprising a bipolar cell provided with bipolar membranes separating a plurality of unit cells, each unit cell comprising an acid compartment facing the cation face of a first bipolar membrane separating the unit cell from one next-adjacent unit cell, at least one intermediate compartment separated from said acid compartment by a first cation-permeable structure and a base compartment facing the anodic face of a second bipolar membrane separating the unit cell from another next-adjacent unit cell and separated from an adjacent intermediate compartment by a second cation-permeable structure, subjecting an aqueous solution of a salt to a first acidification in a first compartment of said plurality of electrolytic cells located adjacent said base compartment by feeding said aqueous solution of a salt is fed sequentially or in parallel through each said intermediate compartment of each said unit cell of said bipolar cell to effect said first acidification, and subjecting said aqueous solution of a salt to a further acidification in a second compartment of each said plurality of electrolytic cells located adjacent to said first compartment by feeding the effluent from said intermediate compartment sequentially through each said acid compartments as said aqueous solution of a salt to effect said further acidification therein.

30. A process for the electrolytic production of an acidified solution which comprises:

providing a plurality of electrolytic cells comprising a bipolar cell provided with bipolar membranes separating a plurality of unit cells, each unit cell comprising an acid compartment facing the cation face of a first bipolar membrane separating the unit cell from one next-adjacent unit cell, at least one intermediate compartment separated from said acid compartment by a first cation-permeable structure and a base compartment facing the anodic face of a second bipolar membrane separating the unit cell from another next-adjacent unit cell and separated from an adjacent intermediate compartment by a second cation-permeable structure, subjecting an aqueous solution of a salt to a first acidification in a first compartment of said plurality of electrolytic cells located adjacent said base compartment, and subjecting said aqueous solution of a salt to a further acidification in a second compartment of each said plurality of cells located adjacent said first compartment by:

circulating said aqueous solution of a salt through each said intermediate compartment or through a loop comprising a plurality of said intermediate compartments to effect said first acidification thereof while a previously-acidified aqueous solution of a salt is circulated through each said acid compartment or through a loop comprising a plurality of said acid compartments to effect said further acidification of said previously-acidified aqueous solution until a desired acidity is achieved, withdrawing the further acidified aqueous solution from said acid compartments as a product acidified solution, passing effluent from said intermediate compartments to said acid compartments as said previously-acidified aqueous solution of a salt circulated therein, passing further first aqueous solution of a salt to the intermediate compartments, and repeating said circulating, withdrawing and passing steps.

31. A process for electrolytic production of an acidified solution of chloric acid, which comprises:

providing at least one electrolytic cell comprising an anodic compartment, a cathodic compartment and at least one intermediate compartment located between said anodic and cathodic compartments, each said compartment being separated from the next adjacent compartment by a cation-permeable structure, applying an electric current between an anode and a cathode of said cell while circulating a first aqueous solution of sodium chlorate through a first compartment located adjacent to said cathodic compartment and circulating a second aqueous solution of sodium chlorate through a second compartment located adjacent to said first compartment to effect acidification thereof until a desired acidity is achieved, withdrawing the acidified aqueous sodium chlorate solution from the second compartment as a product acidified sodium chlorate solution containing chloric acid, passing effluent from the first compartment to said second compartment as said second aqueous sodium chlorate solution circulated therein, passing further first aqueous solution of sodium chlorate to the first compartment, and repeating said circulating, withdrawing and passing steps.

32. The process of claim 31 wherein a plurality of said electrolytic cells is provided and said effluent from the first compartment of one electrolytic cell is passed to the second compartment of a further electrolytic cell to effect said acidification therein.

33. A process for the electrochemical production of an acidified solution, which comprises:

effecting acidification of a previously-acidified aqueous solution of a salt in a first acidification zone of an electrochemical zone by generating hydrogen ions in said first acidification zone while transferring cations of said salt to a second acidification zone of said electrochemical zone adjacent a cathodic zone of said electrochemical zone until a desired acidity for said acidified solution is achieved, withdrawing said acidified solution from said first acidification zone, effecting acidification of an aqueous solution of a salt in said second acidification zone by transfer of hydrogen ions from said first acidification zone while transferring cations of said salt to said cathodic zone until said desired acidity for said acidified solution is achieved to form said previously-acidified aqueous solution and while minimizing the acidity of said aqueous salt solution in said second acidification zone, and forwarding said previously-acidified aqueous solution to said first acidification zone.

34. The process of claim 33 wherein said electrochemical zone comprises a plurality of electrochemical units, said first acidification zone comprises a first acidification compartment of each said electrochemical unit, said second acidification zone comprises a second acidification compartment of each said electrochemical unit and said cathodic zone comprises a cathodic compartment of each said electrochemical unit.

35. The process of claim 34 wherein each said electrochemical unit comprise an anodic compartment constituted by said first acidification compartment.

36. The process of claim 34 wherein said each said electrochemical unit comprise an anodic compartment adjacent to said first acidification compartment.

37. The process of claim 33 wherein said hydrogen ions are produced electrolytically in said first acidifying zone.

38. The process of claim 33 wherein said hydrogen ions are produced by hydrogen gas oxidation in said first acidifying zone.

39. The process of claim 33 wherein a salt comprising said cations is formed in said cathodic zone.

40. The process of claim 39 wherein said salt comprising said cations is produced electrolytically.

41. The process of claim 33 wherein a hydroxide comprising the cation of said salt is produced in said cathodic zone.

* * * * *